United States Patent
Higbie

(10) Patent No.: US 10,977,676 B2
(45) Date of Patent: Apr. 13, 2021

(54) METHOD AND SYSTEM FOR DIGITAL CONTENT PRICING

(71) Applicant: SCRIBLIOTECH, INC., Orange, NH (US)

(72) Inventor: Colin Laird Higbie, Orange, NH (US)

(73) Assignee: SCRIBLIOTECH, INC., Orange, NH (US)

( * ) Notice: Subject to any disclaimer, the term of this patent is extended or adjusted under 35 U.S.C. 154(b) by 750 days.

(21) Appl. No.: 15/638,138

(22) Filed: Jun. 29, 2017

(65) Prior Publication Data

US 2017/0300949 A1 Oct. 19, 2017

Related U.S. Application Data

(60) Division of application No. 13/893,151, filed on May 13, 2013, now abandoned, which is a continuation of application No. 12/886,502, filed on Sep. 20, 2010, now abandoned.

(60) Provisional application No. 61/296,049, filed on Jan. 19, 2010, provisional application No. 61/244,025, filed on Sep. 19, 2009.

(51) Int. Cl.
    *G06Q 10/00* (2012.01)
    *G06Q 30/02* (2012.01)

(52) U.S. Cl.
    CPC ......... *G06Q 30/0206* (2013.01); *G06Q 30/02* (2013.01)

(58) Field of Classification Search
    None
    See application file for complete search history.

(56) References Cited

U.S. PATENT DOCUMENTS

| | | | | |
|---|---|---|---|---|
| 5,794,220 | A * | 8/1998 | Hunt | G06Q 30/06 705/40 |
| 6,519,571 | B1 * | 2/2003 | Guheen | G06Q 30/02 705/14.66 |
| 2001/0047413 | A1 | 11/2001 | Landau et al. | G06F 15/16 |
| 2003/0172135 | A1 * | 9/2003 | Bobick | H04L 63/0428 709/220 |
| 2006/0190290 | A1 * | 8/2006 | Gomez | G06Q 50/188 705/26.1 |
| 2008/0167940 | A1 * | 7/2008 | Dube | G06Q 30/0283 705/7.31 |

(Continued)

OTHER PUBLICATIONS

U.S. Appl. No. 14/286,528, filed May 23, 2014, Higbie.
U.S. Appl. No. 14/616,124, filed Feb. 6, 2013, Higbie.

*Primary Examiner* — Tonya Joseph
(74) *Attorney, Agent, or Firm* — Hayes Soloway P.C.

(57) ABSTRACT

A method for pricing digital content available for purchase and download from a server to a network connected computing device includes providing a quantity of digital content items, which are ranked. A plurality of pricing tiers for the digital content items is created. A sale price of each of the digital content items is designated based on the rank. At least a portion of the digital content items is made available for purchase wherein the sale price for the content to be displayed on at least one user computing device. A download request is received from the user computing device to download at least one digital content item. The sale price of at least a portion of the quantity of the digital content items is adjusted according to the pricing tiers.

21 Claims, 13 Drawing Sheets

(56) References Cited

U.S. PATENT DOCUMENTS

2010/0063877 A1\* 3/2010 Soroca ................ G06F 16/9577
　　　　　　　　　　　　　　　　　　　　　　705/14.45

\* cited by examiner

METHOD AND SYSTEM FOR DIGITAL CONTENT PRICING

CROSS REFERENCE TO RELATED APPLICATION

This application is a divisional of U.S. application Ser. No. 13/893,151, filed May 13, 2013, which in turn is a continuation of U.S. application Ser. No. 12/886,502 filed Sep. 20, 2010, which claims the benefit of U.S. Provisional Application Ser. No. 61/296,049 filed Jan. 19, 2010 and U.S. Provisional Application Ser. No. 61/244,025 filed Sep. 19, 2009, the entire disclosure of which is incorporated herein by reference.

FIELD OF THE DISCLOSURE

The present disclosure is generally related to pricing systems and models and more particularly is related to a method and system for digital content pricing.

BACKGROUND OF THE DISCLOSURE

There exist business practices for sale of downloadable audio files, games, and other software. The Apple® App Store as a part of iTunes® is the best example of such a system. However, as these systems grow in number of applications, both customers and authors share in frustration of identifying the "good" apps. Prices are driven toward $0, as low pricing is necessary to achieve volume, and the market has become a loss leader for larger game studios to promote their titles on other platforms where they can control pricing or for independent developers who accept recognition in place of revenue.

While the prior art includes systems for sale of software and other digital content (audio, video, e-books, and other) online, and while the free market is a means of supply and demand price setting, there are no systems that combine these in an automated fashion. Furthermore, one of the largest complaints among developers and other digital content authors on popular downloading websites is that it is difficult to generate sufficient revenue, because prices are driven toward $0 in order to attract customers. Rating systems exist, but are too subjective and sales volumes remain largely a function of price.

Thus, a heretofore unaddressed need exists in the industry to address the aforementioned deficiencies and inadequacies.

SUMMARY OF THE DISCLOSURE

Embodiments of the present disclosure provide a system and method for a physical computer storage device having stored thereon instructions for pricing digital content available for purchase and download. Briefly described, in architecture, one embodiment of the system, among others, can be implemented as follows. The physical computer storage device has stored thereon instructions for pricing digital content available for purchase and download from a server to a network connected computing device, which when executed by a processor, causes the processor to perform the steps of: providing a quantity of digital content items; ranking each of the digital content items relative each other; designating each of the ranked digital content items into at least one of a plurality of pricing tiers based on the rank of the digital content item, respectively; electronically making at least a portion of the ranked digital content items available for purchase on a network, whereby a sale price of the ranked digital content item is displayed on at least one user computing device, wherein the sale price is based on the pricing tier that the digital content item is designated in; receiving at least one download request from the at least one user computing device to download at least one digital content item, whereby the at least one of the digital content items is downloaded from the server to the at least one user computing device via the network; and adjusting the sale price of at least a portion of the quantity of the digital content items by re-ranking at least a portion of the digital content items; and designating each of the re-ranked digital content items into at least one of the plurality of pricing tiers.

The present disclosure can also be viewed as providing methods for pricing digital content available for purchase and download from a server to a network connected computing device. In this regard, one embodiment of such a method, among others, can be broadly summarized by the following steps: (a) providing a quantity of digital content items; (b) ranking each of the digital content items; (c) creating a plurality of pricing tiers for the digital content items; (d) designating each of the digital content items to have a sale price within at least one of the plurality of pricing tiers based on the rank of the digital content items; (e) electronically making at least a portion of the digital content items available for purchase by transmitting computer executable code over a network that causes the sale price for the content to be displayed on at least one user computing device; (f) receiving at least one download request from the at least one user computing device to download at least one digital content item, whereby the at least one of the digital content items is downloaded from the server to the at least one user computing device; and (g) adjusting the sale price of at least a portion of the quantity of the digital content items according to the pricing tiers wherein the step of adjusting comprises: (h) re-ranking at least a portion of the digital content items; and (i) repeating the steps of (e) through (h).

The present disclosure can also be viewed as providing a system for pricing digital content. Briefly described, in architecture, one embodiment of the system, among others, can be implemented as follows. The system for pricing digital content includes computer executable code modules stored in a memory of a computer wherein the code modules are executed by a processor of the computer which is in communication with the memory, the memory comprising: (a) a digital content module for receiving and storing digital content items; (b) a ranking module for ranking the digital content items; (c) a tier module for creating a plurality of pricing tiers of the digital content items; (d) a sale price module for designating a sale price for each of the digital content items based on the ranking of the digital content items, wherein the ranked digital content item is designated into one of the plurality of pricing tiers based on the designated sale price; (e) a publishing module for electronically making the digital content items available for purchase that cause the sale price for the digital content items to be displayed on at least on user computing device; (f) a download module for receiving a download request from the at least one user computing device to download at least one digital content item, whereby the at least one digital content item is downloaded from the server to the at least one user computing device; (g) a price adjustment module for adjusting the sale price for the digital content item according to the pricing tiers; (h) a re-ranking module for re-ranking the digital content items; and (i) a tier modification module for modifying the pricing tiers by at least one of: creating, adding, deleting, and splitting the pricing tiers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
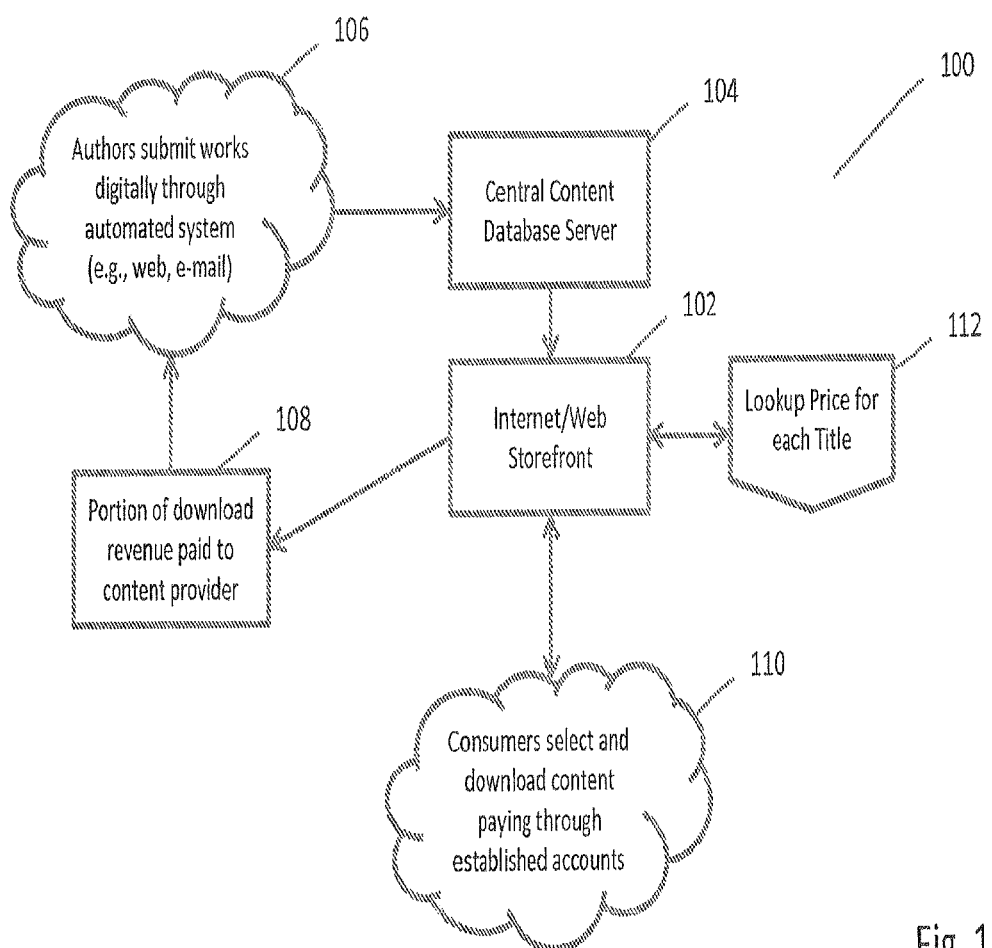
FIG. 1A is a schematic illustration of a system for digital content pricing, in accordance with a first exemplary embodiment.

As described in the embodiments and examples below, the disclosure is not limited to any particular configuration or orientation described, but is only limited to the appended claims, their equivalents, and also future claims submitted in this and related applications and their equivalents. Also, many configurations, dimensions, geometries, and other features and physical and operational characteristics of any particular embodiment or example may vary in different applications without departing from the spirit and scope of the disclosure, which, again, are defined by the appended claims, their equivalents, and also future claims submitted in this and related applications and their equivalents.

In the following description, numerous specific details are set forth in order to provide a thorough understanding of the disclosure. However, it will be apparent to one skilled in the art that the disclosure can be practiced without these specific details. In other instances, well known circuits, components, algorithms, and processes have not been shown in detail or have been illustrated in schematic or block diagram form in order not to obscure the disclosure in unnecessary detail. Additionally, for the most part, details concerning materials, tooling, process timing, circuit layout, and die design have been omitted inasmuch as such details are not considered necessary to obtain a complete understanding of the disclosure and are considered to be within the understanding of persons of ordinary skill in the relevant art. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ."

Embodiments of the disclosure are described herein. Those of ordinary skill in the art will realize that the following detailed description of the disclosure is illustrative only and is not intended to be in any way limiting. Other embodiments of the disclosure will readily suggest themselves to such skilled persons having the benefit of this disclosure. Reference will be made in detail to implementations of the disclosure as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals. Moreover, it will be appreciated that such a development effort might be complex and time-consuming, but would nevertheless be a routine undertaking of engineering for those of ordinary skill in the art having the benefit of this disclosure.

Provided is a system for delivering downloadable digital content that rewards authors and content owners using a unique pricing model. As used herein, authors may include and be interchangeable with content owners that may or may not have authored content, including content providers that could just as easily be musicians, programmers, or video/film directors—anything that lends itself to digital distribution. In particular embodiments and examples below are a system for delivering digital content using a price setting formula whereby prices increase as volume of downloads or purchases increases and prices decrease as volumes decrease. Such a system fairly rewards vendors and authors based on the market appeal of their product while simultaneously communicating to buyers that a given product's price has been fairly set by genuine interest from other like-minded customers. In one embodiment, the system correlates price to value in a way that is not currently done by sellers in mass digital markets, defined here as any system offering more products than can be easily browsed and downloaded. These products may be comparable to each other, such as digital games, books, or music of a given genre, and may be offered by different sellers.

Traditional marketing involves price-setting as a function of cost of goods, the producer's desired margin, a string of value-add channel partners along the way, and the marketer's sense on the reaction of the market to price—higher prices may communicate quality, lower prices may enable reaching a different demographic, split pricing may allow one company to flank a competitive product, etc. However, these traditional approaches are not effective in the Mass Double-Sided Digital (MDSD) market, where there are large numbers of both buyers and sellers, but unlike a commodity market, the sellers' products are each unique (i.e., with commodities a pound of flour, beets, or silver from one farmer or miner is interchangeable with a pound of flour or beets from another, but with authored digital content, one punk rock song, poem, or sci-fi novel is not interchangeable with another, even if from the same author). Furthermore, on the production side, the cost of production is insubstantial, channel partners can be removed from all but the sales function (the web store), and promotion is nearly impossible as there is simply not enough available media for the thousands of available products to even reach consumers (iTunes has millions of songs, the App Store has over 200,000 applications as of mid-2010).

This disclosure may be a solution to this modern capitalist conundrum of the digital age, by using a software system to calculate prices for a large collection of similar items from competing developers or producers available for purchase as digital downloads, where such price calculations may be based on the relative volumes of downloads of each item in a prior time period and further where such prices may have a fixed or flexible number of tiers. The software system may set the prices for a web site that offers price information for products available for digital download, and/or set the prices for a retail location that offers products available for digital download (e.g., music stores that let people select songs to make their own CD's).

While the system is described relative to downloadable content items, it is noted that the software system may be applied to similar physical items instead of digital downloadable content, where price floors are established as a minimum markup from cost, such as a web site that offers similar physical items for purchase. For example, the system and process described herein may be successful for on-demand printing or any other good that can be made in small production runs for less popular items. The system or process could also be applied to non-production items, like parking spaces or tee times at the golf course, where some are more popular than others.

The system may vary depending on the design of the system, which may be based on the intended use of the system. For example, the system may use a number of pricing tiers to control the price of a content item, but it may be possible for manual override of a pricing tier, such as to change the number of tiers, the pricing on the tiers, or otherwise modify the results of the automatic pricing for any purpose. The system may also use existing digital recording tools to enable content owners or content providers to post various content items directly. The system may include reporting tools for providing usage reports. For example, the system may utilize a reporting tool that shows historical revenue, download volume, etc. across all content items offered for sale. The system may be capable of analyzing any of the reports to provide guidance on future operation of the system, such as by identifying trends with content item purchases or downloads. In one example, it may be beneficial to have a reporting tool that reports revenue of the system based only on the crowd-priced content items.

In one embodiment, the author/creator posts his work to a central server. Optionally, the author may set a starting price or a minimum price floor (such non-automatic prices will always be noted as such to the customers). Depending on the market segment, the system features a ranged set of default values that could range from free to the typically accepted upper range for such a product. The system may start with a conservative upper range. For audiobooks this upper range might be, for example, $19.99, and for songs it might be, for example, $1.29, or $8.99 and $0.89, respectively, for works from unknown authors or music artists.

A set of stratified pricing values fill the range between lowest and highest. The starting number of steps can vary, but 7 is the default. Similarly, the differences between them can also vary. Consumers may purchase via download. If the author was allowed to set the price (step 2 above), consumers can see the price and whether it is the original author's price (in which case they know it has not been set by market interest) or set by the market, pursuant to the system described herein. Prices may be adjusted based on the number of downloads for each title at the current price during the preceding unit of time ($\Delta t$, default is 2 weeks) and the percentage of download volume compared with all other works available in that genre. Once a product's price is adjusted, it is assured that it will stay in its new pricing strata for at least the default unit of time ($\Delta t$).

In one example, the default is that the percentile breaks would be logarithmic based on volume, but optionally could be evenly spaced linearly, follow some other formula, or even be selected manually. These could also optionally be stratified by genre, recognizing that some categories may be smaller, but still comprise a market segment willing to pay more for quality work (e.g., historical audiobooks could be compared only with other historical audiobooks, rather than with all audiobooks). Other non-default options include a longer trailing period of volume calculation to reduce pricing volatility.

In another example, if the number of purchases at the top tier is more than a defined amount relative to the next lower tier (default is half), another higher tier is added automatically setting the volume limit for that tier to be the top segment as defined (default is the top third). The actual dollar amount of the increase could either be $1, any other set increase amount, the next step in a pre-defined set of tiered pricing, or functionally calculated based on the previous tiers (e.g., previous top tier+20%). In one example, the tiers may range from the bottom 50%, which are set to be free, to the top 1% tier, which are set based on market standard pricing for a popular/best seller in that genre, and the tiers between the bottom and the top may be priced between the prices of the bottom and top tiers.

Referring now to the figures, examples of systems and methods of downloading and selling digital content according to the broad disclosure are provided. In any of these examples, the particular process steps are set forth for illustration, and those skilled in the art will understand that the process steps may or may not be performed in the particular order as illustrated in the figures or as described below.

FIG. 1A shows a flow chart for a system configured according to the disclosure. As can be seen, the system 100 includes an internet storefront 102 that may be frequented by users to purchase content online. The storefront 102 is configured to receive content from a central content database 104, where authors store or otherwise submit works that are digitally formatted and submitted via an automated system 106, such as web uploading, email transfer, FTP site, or other means. Once a user purchases an author's content, a portion of the downloaded revenue is paid to the author or content provider via 108. This may be either immediately per transaction or in batches on a weekly, monthly, or other basis. In operation, the store then looks up the price via an algorithm 112 that establishes prices for each content title or content product, and provides the storefront the price for sale based on the market behavior of the product. The consumers 110 select and download content, paying through established accounts with the web store or a third party, such as PAYPAL®.

Figure 1B:
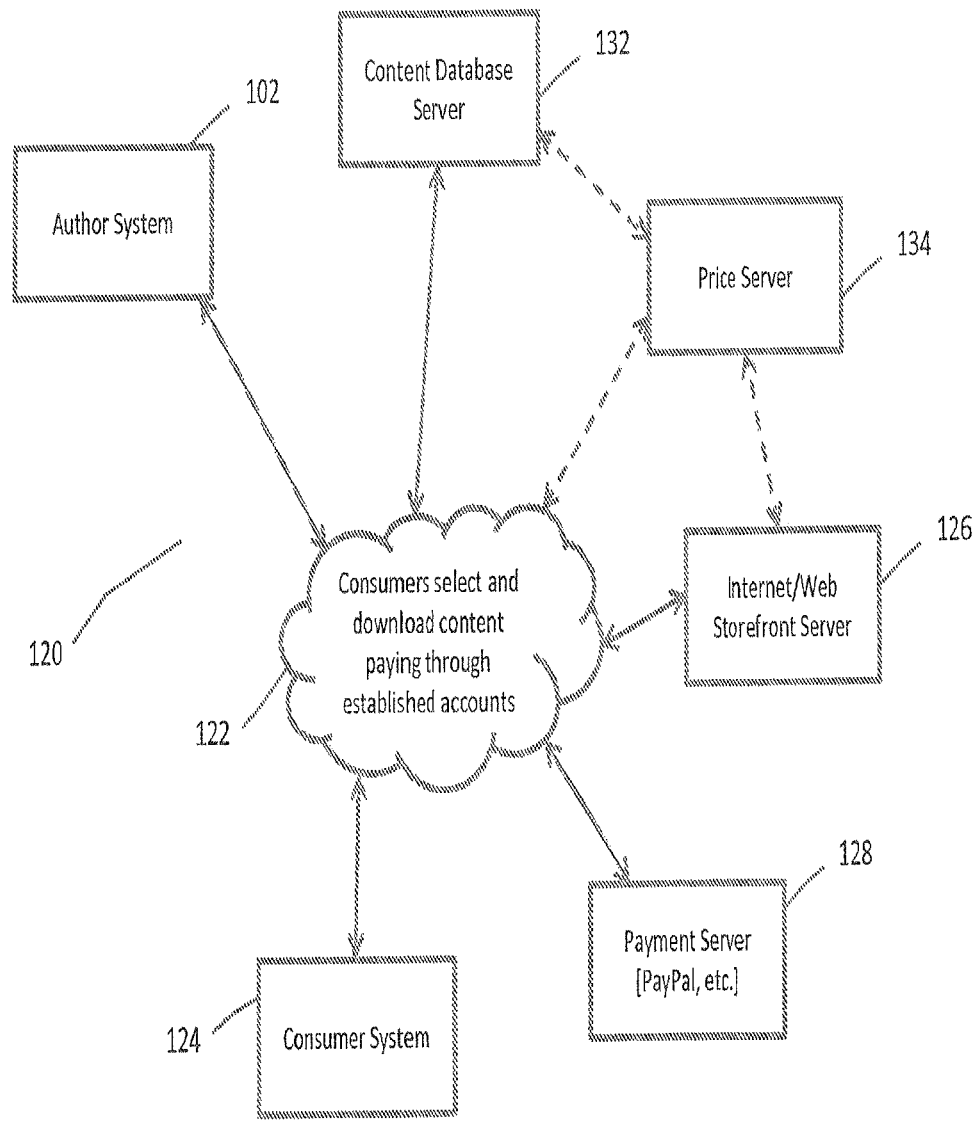
FIG. 1B is a schematic illustration of network architecture for a system for digital content pricing, in accordance with the first exemplary embodiment.

FIG. 1B shows a general network architecture for a system configured according to the disclosure. The internet and other networks 122 are the center of the marketing infrastructure, and these allow consumer systems 124 to access other entities on the Internet such as Internet/web storefront servers 126. Payment entities 128 such as PAYPAL®, and other entities, may be utilized by the buyers and sellers to buy and sell content via the internet, allowing a user to purchase content without the need to physically enter a store to purchase and pickup a physical device or storage device that has content stored thereon. According to the disclosure, an authoring compensation system may be provided via a system that includes an author system 130, which may simply be another user or content provider (whether or not an actual author, the content may be owned by a content provider that may not in fact be a content owner, and the content providers could just as easily be musicians, programmers, or video/film directors-anything that lends itself to digital distribution) that is uploading content for sale to other users. The author system may upload content to a content database 132 for storage to be later downloaded to consumers via storefronts or other means to enable a sale of the content to the user and later compensation to the storefront and the author. According to one embodiment, a price server 134 may be included to set prices for the content based on purchase behavior. The price server may be a separate entity that communicates directly with the internet or other networks 122, or it may be incorporated in other entities such as the content database server 132, the internet storefront 126, the payment server 128, or other entities, and other combinations and permutations of these and other entities may be incorporated into a single entity without departing from the disclosure as claimed. In fact, all three of these entities and other entities may be incorporated together in one physical entity to perform the desired operations according to the disclosure.

Figure 2:
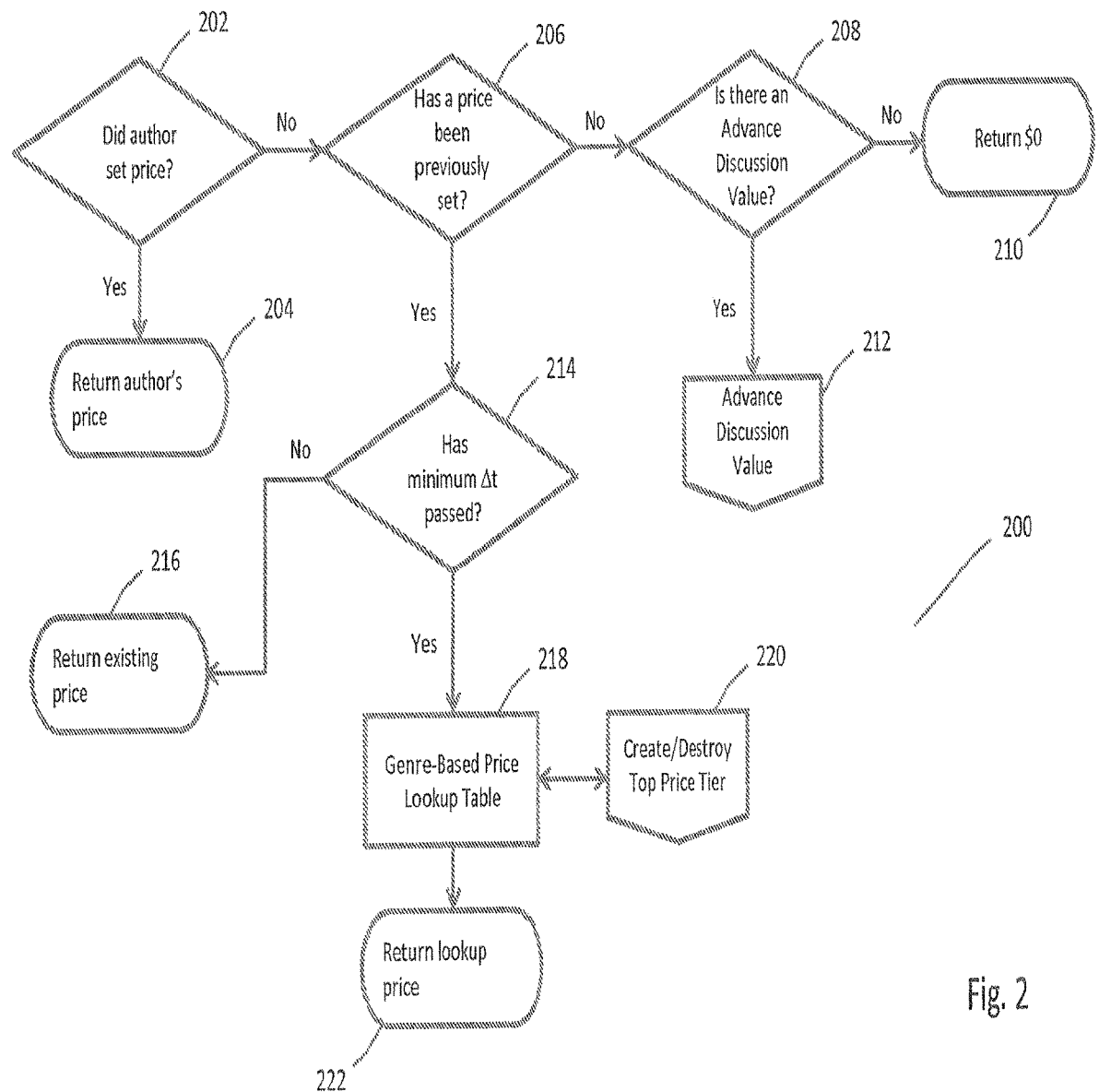
FIG. 2 is a flow chart for a method of digital content pricing, in accordance with a second exemplary embodiment.

FIG. 2 shows a flow chart for a method of looking up a price for a digital download product that includes pricing methods for use in a system configured according to the disclosure. The system 200 starts in step 202, where it is queried whether the author has set a price. In one embodiment, the author may not be allowed to set the price, but will be subject to automatic price setting in the system. There is also a hybrid—where the author sets an initial price, but after that, the system takes over. In effect, in such an embodiment, it would only go to #204 if it's within the original Δt.

In one embodiment, Δt may be set by default to be 2 weeks. The prices change every 2 weeks. It could also be set to change not after a fixed period of time elapses, but more rapidly if the download rate is sufficient to justify it (e.g., if in 1 day a given title receives as many downloads as a title from the tier above it received in the prior 2-week period, it could be immediately upgraded to the next higher tier).

If the author has set a price, it is returned in step 204, typically to the storefront for display or delivery to a prospective purchaser. If not, the process queries in step 206 whether a price has previously been set by an author, whether the same, similar or a different author and whether the same, similar or different product. If it has been previously set by a previous pass through the subroutine, and if a predetermined amount of time has NOT passed in step 214, then the existing price is returned in step 216. If the minimum time has passed, then a genre-based prices lookup table is queried in step 218, a call to the create/destroy top price tier subroutine is performed in step 220 to assess whether to split the current top tier and add a new one, or remove the top tier, merging its members with the former second tier, and the lookup price for each title is returned in step 222 wherein the price is selected from a table specific to the title's master genre (e.g., songs, novels, short stories) and based on the title's ranking within its specific genre (e.g., vampire romance novels, hard sci-fi novels, historical fiction novels), such as by means of one such example, in this case for books:

TABLE 1

| Ranking % | Price | | | |
| --- | --- | --- | --- | --- |
| | Books | Novellas | Shorts | Flash |
| 50.00% | $ — | $ — | $ — | $ — |
| 25.00% | $0.29 | $0.29 | $0.24 | $0.09 |
| 10.00% | $0.49 | $0.49 | $0.39 | $0.14 |
| 5.00% | $0.99 | $0.89 | $0.69 | $0.19 |
| 4.00% | $2.99 | $1.99 | $0.99 | $0.29 |
| 3.00% | $4.99 | $2.99 | $1.49 | $0.49 |
| 2.00% | $6.99 | $3.99 | $1.99 | $0.79 |
| 1.00% | $8.99 | $4.99 | $2.99 | $0.99 |

Referring back to step 206, if the price has not previously been set, then there is a query whether there is an advance discussion value in step 208. If there is, then the advance discussion value is returned in step 212. In accordance with this disclosure, higher than normal discussion on or attention to a particular or popular topic may be referred to herein as 'advance discussion' or 'buzz' and when this discussion or attention is present on a social network it may be referred to as 'social network buzz.' Social network buzz may be determined by an analysis of the topics discussed within a social network system. The buzz or advance discussion may be quantified into a value, such as a binary or numerical value. For example, the system may identify a book that has been heavily discussed on social networking partner sites, e.g., the *Twilight* or *Harry Potter* books, to identify these items as having advance discussion value or social networking buzz. The system may monitor advanced discussion value content items to assist with determining a starting price of the content item (other than a free or a bottom tier price).

In one example, tracking titles as keywords on a social network allows a system to see that a given title is receiving a lot of buzz in advance of its release and therefore should not start with a $0 price. For example, if there were another Harry Potter book about to be released, advance discussions on Facebook® would occur. Based on the number of such references, the system could set a starting price from the table for a novel, say $6.99 or $8.99. If not in step 206, then $0.00 is returned as the value in step 210.

It is noted that the genre-based prices lookup table may vary depending on various circumstances, including the type of content item being priced. For example, the prices provided in table 1 may be accurate for all fictional genres at a given period of time. However, these prices may be changed over time, such as due to inflation, market changes, etc. In another example, non-fiction content items, such as text books, may be priced differently from works of fiction, since textbooks generally cost more than novels. Poetry and other divergent genres may also have differing prices. For all content items, it is beneficial—but not strictly required— that the top tier for any genre would be priced comparably to market established prices for best sellers. All other tiers are set to be tiered down from that top price.

It is important to note that because this pricing system may use a table, the prices may not vary by a formula, but rather a lookup on the table, such that the tier prices themselves are set by a marketing team. This configuration allows for pricing to be competitive and incorporate consumer-buying attributes, such as having all prices end in a '9'. While such a team setting a price for an individual book may indeed maximize profits for that book in a vacuum, it may also weaken the market as a whole, including the prospective revenue for top performing titles. Accordingly, the present disclosure may maximize the total transactions of the marketplace by building trust, which in turn provides a larger pool of total revenue to be divided among titles of interest. It is noted that formula-based pricing systems can be used within this disclosure in place of or in cooperation with a table-based look-up system.

Further, it is noted that while the pricing tiers may be largely controlled by the system, it is possible for authors (or other content providers) to set their own prices for their content items. Allowing the content providers to set their prices may be important in allowing consumers and users of the system to see that the system has high integrity in providing content items at competitive prices. If a content owner did set the price of their content item, this fact may be conveyed to the user of the system, thereby allowing him or her to know which titles are crowd-priced, i.e., priced by the system or priced using pricing tables, and which are provider-priced by the content provider. Any combination of crowd-pricing and provider-pricing may be used with the system.

Figure 3:
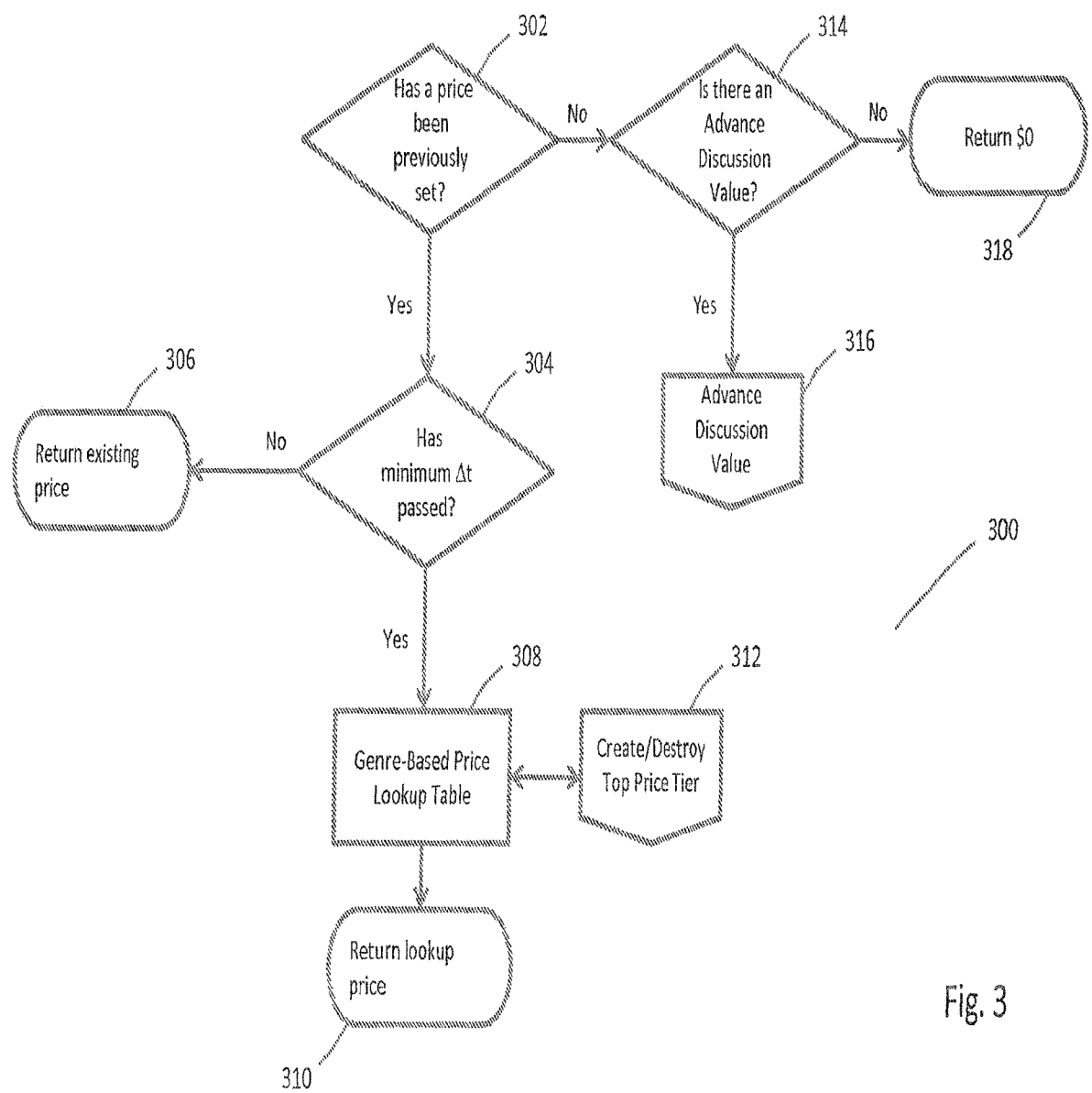
FIG. 3 is a flow chart for a method of digital content pricing, in accordance with a third exemplary embodiment.

FIG. 3 shows a flow chart 300 for a method for use in a system configured according to the disclosure. In step 302, it is queried whether a price has previously been set. If it has, it is queried whether a predetermined time has passed in step 304. If not, then the existing price is returned in step 306. If a minimum time has passed, then a genre-based price lookup table is queried in step 308. A create/destroy a top price tier process is performed in step 312, and the lookup price is returned. Back to step 302, if a price has not been previously set, then in step 314 it is queried whether there is an advance discussion value that would set an initial price. If yes, then the advance discussion value is retrieved and used for the initial price in step 316, and if not, then $0.00 is returned in step 318.

The minimum time used within the process may vary, and any period of time may be selected as the minimum time. For example, a standard minimum time may be 2 weeks. However, depending on the content item or the provider of the content item, the minimum time may be 1 month, because the lesser minimum time periods are too quick. For certain content items, such as news reports where the appeal is very time dependent and fades quickly as it ages, the minimum time frame could be a small number of days or even hours. For example, if lots of aspiring reporters were writing about the verdict in a murder case, the prices for access to those articles may be set within hours, since longer periods of time may significantly decrease the value of the content item.

For certain content items, such as periodicals or other time-sensitive reporting, an alternative approach could be to treat all works by the author in the aggregate. For example, reporter A's new reports are always popular, so her new works appear in a higher tier. Reporter B's stories are not as popular and so her works don't start in as high a tier. In this case, the re-tiering may be back to the bi-weekly or monthly rate, but instead of applying per title, it would apply to all "news stories" in the news genre (i.e., murder trial coverage). A similar differential option may be applied to periodicals to set a monthly or annual subscription price.

Figure 4:
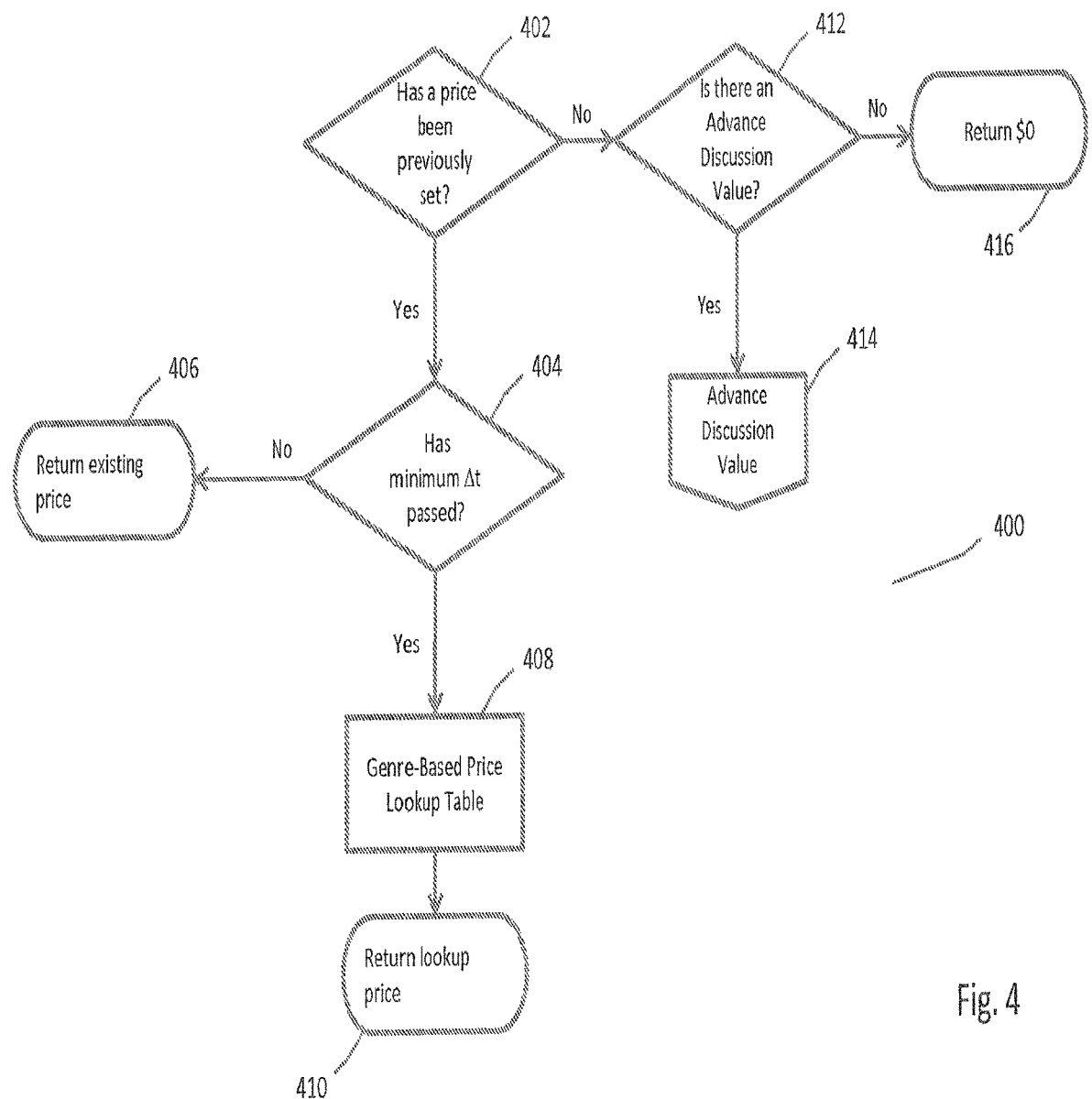
FIG. 4 is a flow chart for a method of digital content pricing, in accordance with a fourth exemplary embodiment.

FIG. 4 shows a flow chart 400 for a method for use in a system configured according to the disclosure. In step 402, it is queried whether a price has previously been set. If it has, then in step 404 it is queried whether a predetermined time has passed. If not, then the existing price is returned in step 406. If a minimum time has passed, then a genre-based price lookup table is queried in step 408 and a lookup price is returned in step 410. Back to step 402, if a price has not been previously set, then in step 412 it is queried whether there is an advance discussion value that would set an initial price. If yes, then the advance discussion value is retrieved and used for the initial price in step 414, and if not, then $0.00 is returned in step 416.

Figure 5:
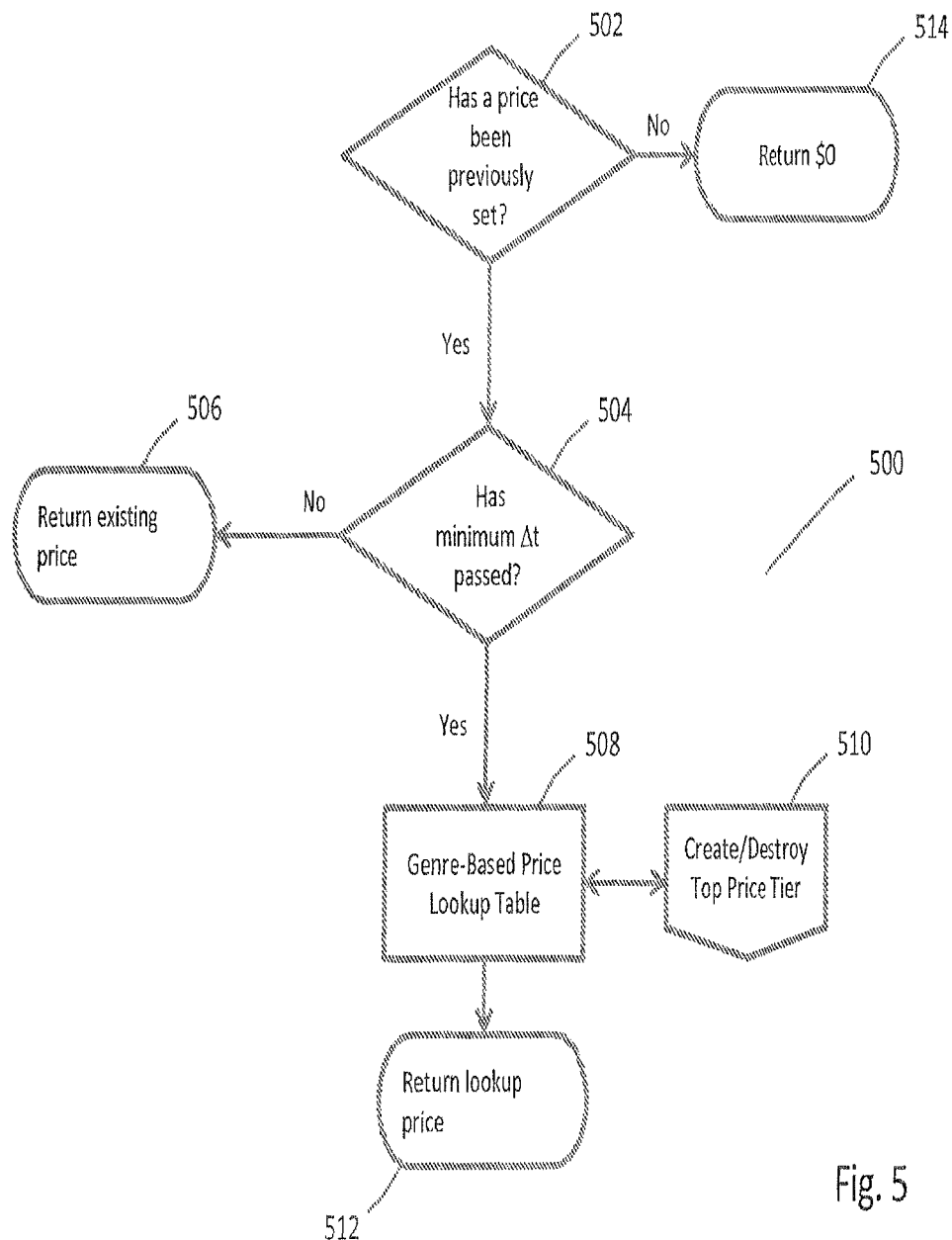
FIG. 5 is a flow chart for a method of digital content pricing, in accordance with a fifth exemplary embodiment.

FIG. 5 shows a flow chart for a method for use in a system configured according to the disclosure. In step 502, it is queried whether a price has previously been set. If it has, then in step 504 it is queried whether a predetermined time has passed. If not, then the existing price is returned in step 506. If a minimum time has passed, then a genre-based price lookup table is queried in step 508, a create/destroy top price tier is done in step 510 and a lookup price is returned in step 510. Back to step 502, if a price has not been previously set, then in step 514 $0.00 is returned.

Figure 6:
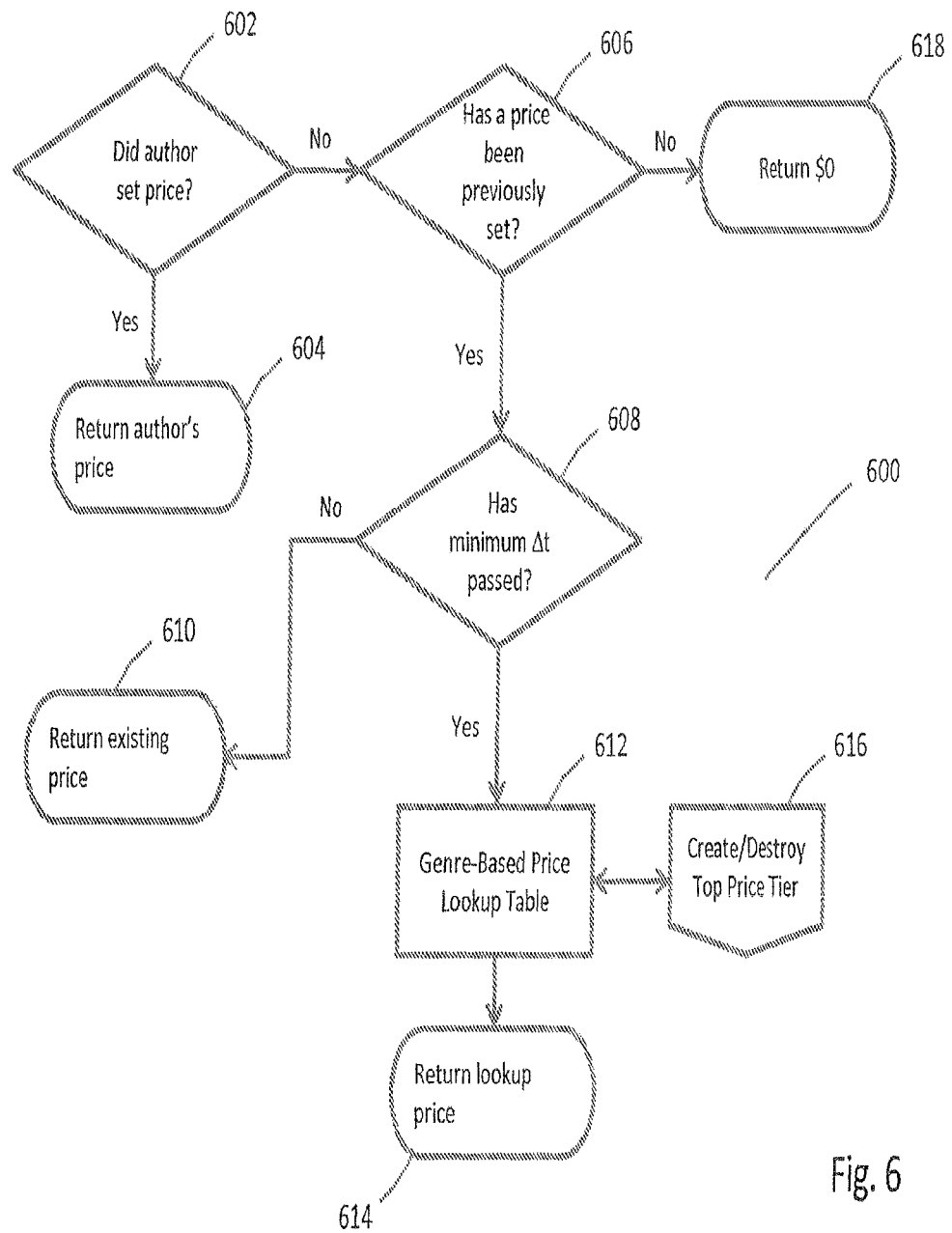
FIG. 6 is a flow chart for a method of digital content pricing, in accordance with a sixth exemplary embodiment.

FIG. 6 shows a flow chart for a method for use in a system configured according to the disclosure. In step 602, it is queried whether the author set the price. If yes, then the author price is returned in 604. If not, then it is queried whether the price has previously been set in 606. If no, then $0.00 is returned in 618. If yes in step 606, then it is queried in 608 whether a minimum time has passed, and if no then the existing price is returned in step 610. If yes in 608, then a genre based price lookup table process is done in step 612, a create/destroy top price tier is performed in step 616, and the lookup table price is returned in 614.

Figure 7:
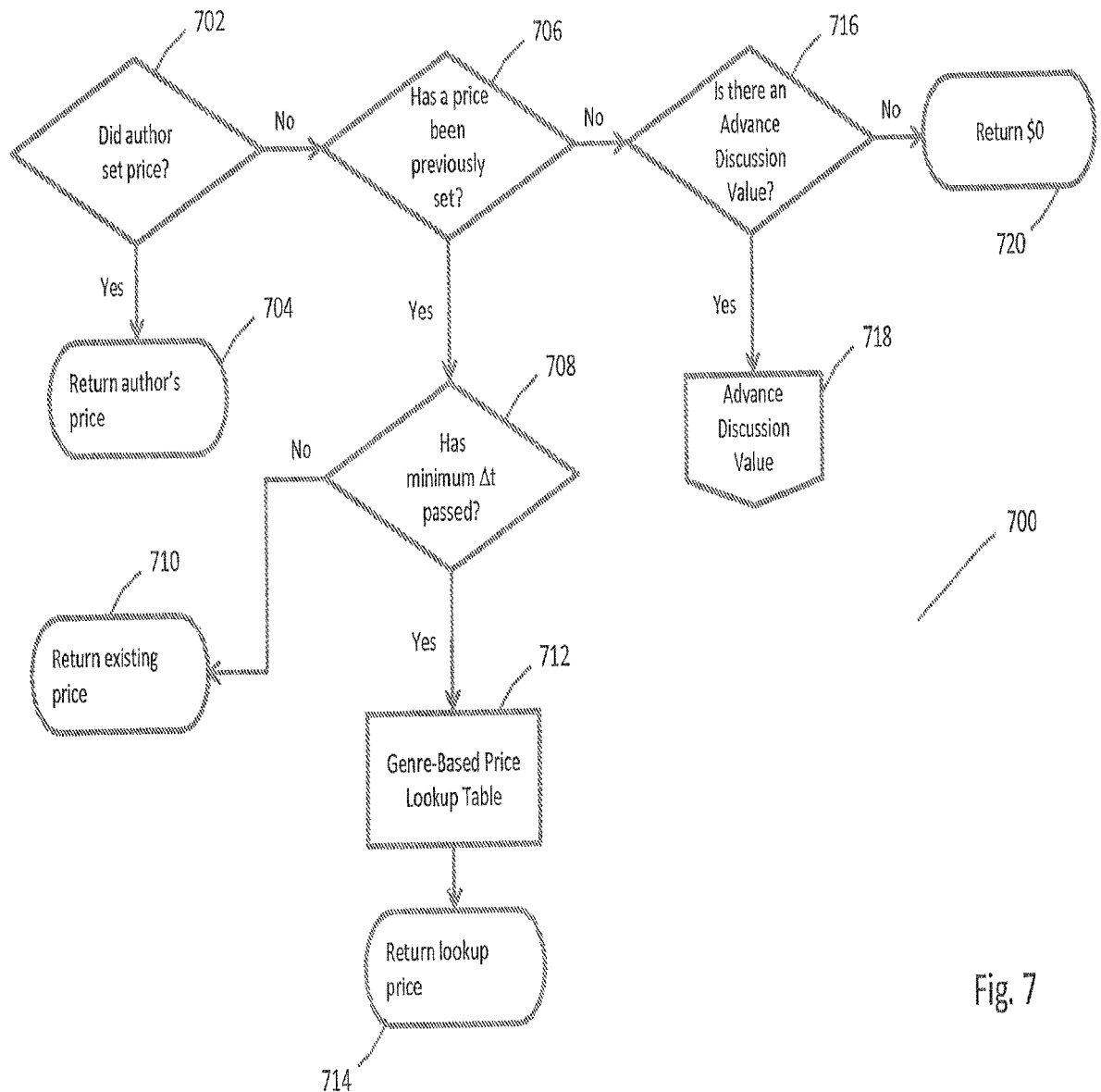
FIG. 7 is a flow chart for a method of digital content pricing, in accordance with a seventh exemplary embodiment.

FIG. 7 shows a flow chart for a method for use in a system configured according to the disclosure. In step 702, it is queried whether the author set the price. If yes, then the author price is returned in 704. If not, then it is queried whether the price has previously been set in 706. If yes in step 706, then it is queried in 708 whether a minimum time has passed, and if no then the existing price is returned in step 710. If yes in 708, then a genre-based price lookup table process is done in step 712, and the lookup table price is returned in 714. If no in step 706, then it is queried if there is an advance discussion value in step 716, and if yes then an advance discussion value is obtained in step 718 and used to set an initial price, and if no in 716 then $0.00 is returned in step 720.

Figure 8:
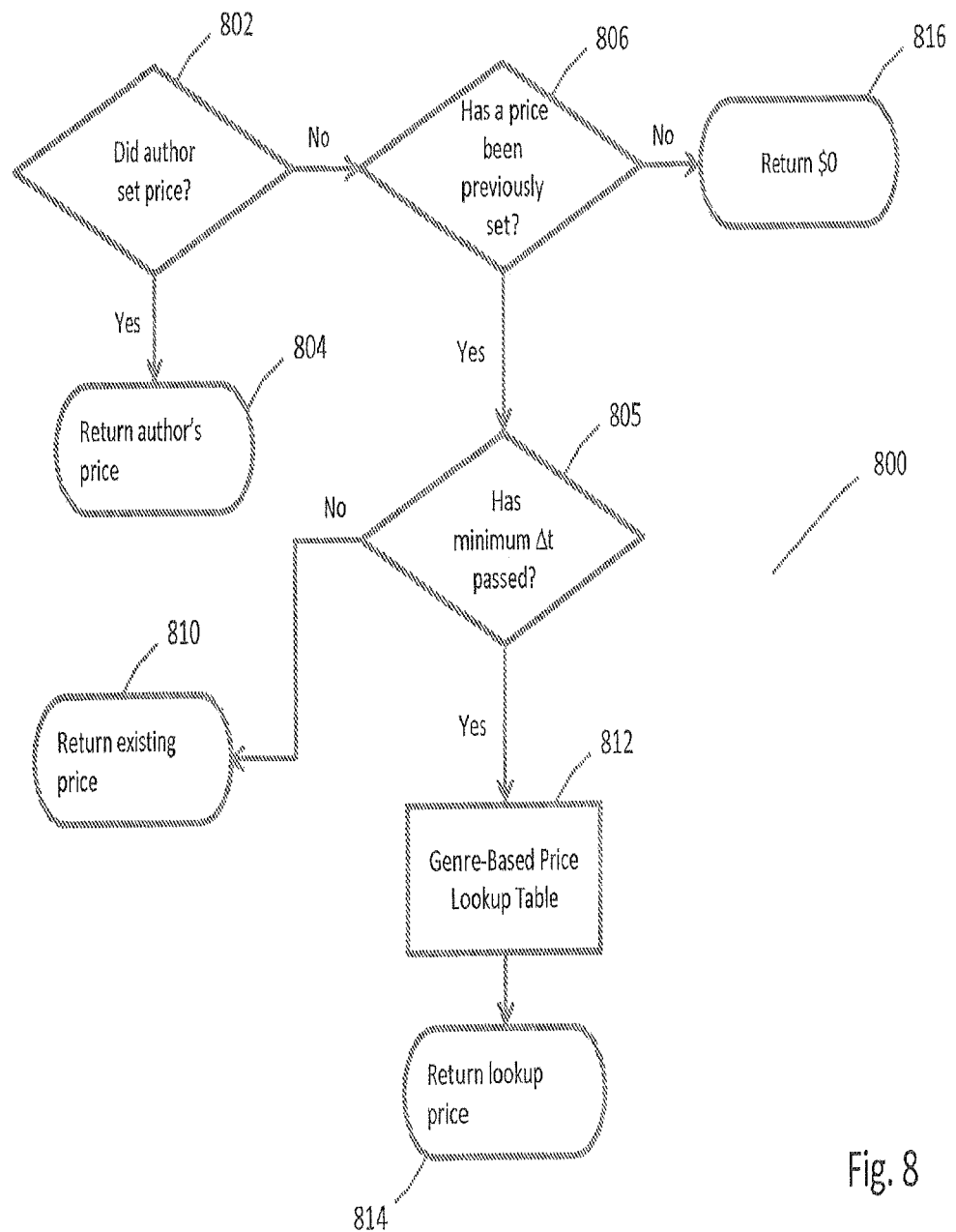
FIG. 8 is a flow chart for a method of digital content pricing, in accordance with an eighth exemplary embodiment.

FIG. 8 shows a flow chart for a method for use in a system configured according to the disclosure. In step 802, it is queried whether the author set the price. If yes, then the author price is returned in 804. If not, then it is queried whether the price has previously been set in 806. If no, then $0.00 is returned in 818. If yes in step 806, then it is queried in 808 whether a minimum time has passed, and if no then the existing price is returned in step 810. If yes in 812, then a genre-based price lookup table process is done in step 812, a create/destroy top price tier is performed in step 816, and the lookup table price is returned in 814. If no in 806, then $0.00 is returned in step 816.

Figure 9A:
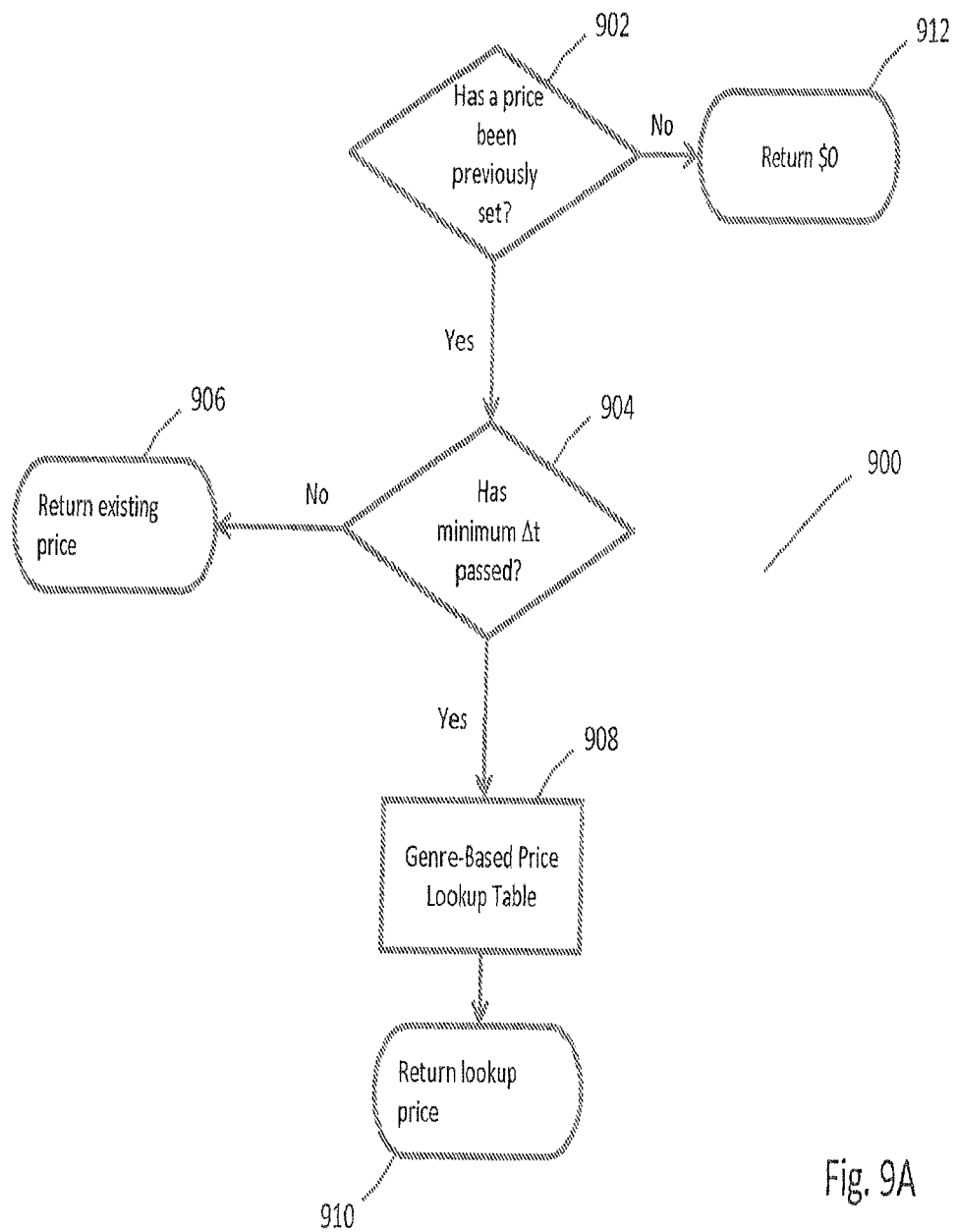
FIG. 9A is a flow chart for a method of digital content pricing, in accordance with a ninth exemplary embodiment.

FIG. 9A shows a flow chart for a method for use in a system configured according to the disclosure. In step 902, it is queried whether a price has previously been set. If it has, then in step 904 it is queried whether a predetermined time has passed. If not, then the existing price is returned in step 906. If a minimum time has passed, then a genre-based price lookup table is queried in step 908 and a lookup price is returned in step 910. Back to step 902, if a price has not been previously set, then $0.00 is returned in step 916.

Figure 9B:
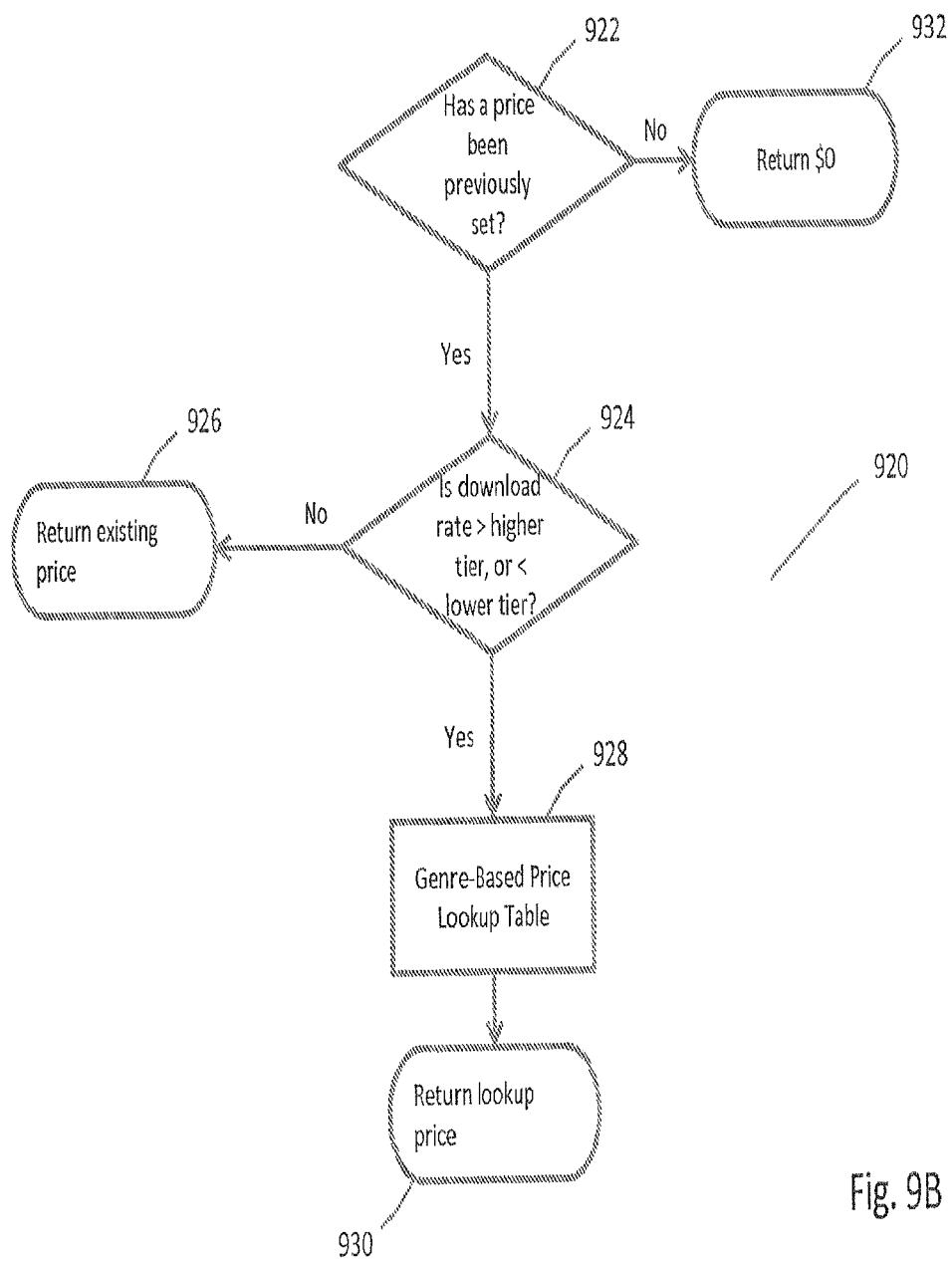
FIG. 9B is a flow chart for a method of digital content pricing, in accordance with the ninth exemplary embodiment.

FIG. 9B shows a flow chart for a method for use in a system configured according to the disclosure. In step 922, it is queried whether a price has previously been set. If it has, then in step 924 it is queried whether the download rate is greater than the higher tier or less than the lower tier. If not, then the existing price is returned in step 926. If yes, then a genre-based price lookup table is queried in step 928 and a lookup price is returned in step 930. Back to step 922, if a price has not been previously set, then $0.00 is returned in step 932.

Figure 10:
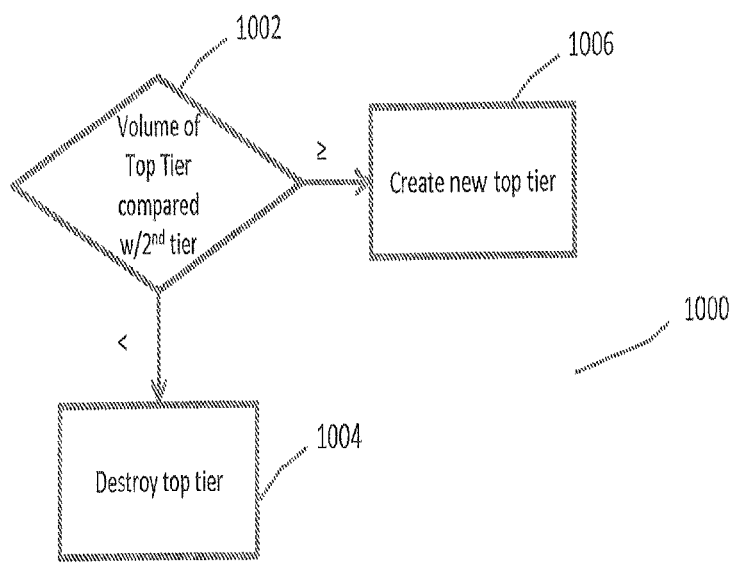
FIG. 10 is a flow chart for a method of digital content pricing, in accordance with a tenth exemplary embodiment.

FIG. 10 illustrates a process in which top tiers are created or destroyed. In step 1002, the volume of the top tier is compared to the volume of the second tier. If the top tier download volume is greater than or equal to that of the second tier, then a new top tier is created in step 1006. If the top tier is less than the second tier, then the top tier is destroyed, with all titles being re-assigned to the remaining tiers according to their relative popularity. This is the preferred method when all titles are re-tiered and priced at the same time after every unit of time (t).

Figure 11:
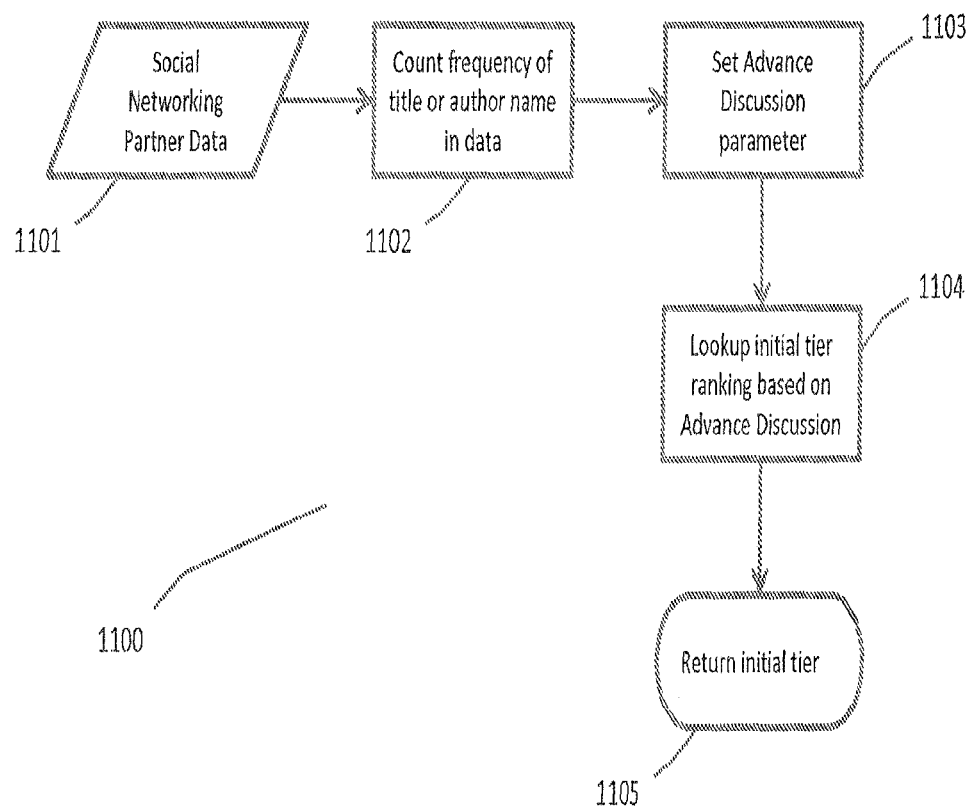
FIG. 11 is a flow chart for a method of digital content pricing, in accordance with an eleventh exemplary embodiment.

FIG. 11 illustrates a process 1100 in which the advance discussion process is performed. In step 1101, the social networking partner data is received. In step 1102, the count frequency of the title or author name in data is measured. In step 1103, an advance discussion parameter is set. In step 1104, a process is performed to lookup an initial tier based on advance discussion. In step 1105, the initial tier is returned.

While certain exemplary embodiments have been described and shown in the accompanying drawings, it is to be understood that such embodiments are merely illustrative of and not restrictive on the broad disclosure, and that this disclosure is not limited to the specific constructions and arrangements shown and described, since various other modifications may occur to those ordinarily skilled in the art. Hence, alternative arrangements and/or quantities of, connections of various sorts, computer network systems that include arrangements and quantities of transistors to form circuits, and other features and functions can occur without departing from the spirit and scope of the disclosure. Similarly, components not explicitly mentioned in this specification can be included in various embodiments of this disclosure without departing from the spirit and scope of the disclosure. Also, different process steps and integrated circuit manufacture operations described as being performed to make certain components in various embodiments of this disclosure can, as would be apparent to one skilled in the art, be readily performed in whole or in part to make different components or in different configurations of components not explicitly mentioned in this specification without departing from the spirit and scope of the disclosure. Accordingly, the specification and drawings are to be regarded in an illustrative rather than a restrictive sense.

While certain exemplary embodiments have been described and shown in the accompanying drawings, it is to be understood that such embodiments are merely illustrative of and not restrictive on the broad disclosure, and that this disclosure is not limited to the specific constructions and arrangements shown and described, since various other modifications may occur to those ordinarily skilled in the art. Accordingly, the specification and drawings are to be regarded in an illustrative rather than a restrictive sense.

Again, the disclosure has application in many areas, particularly in internet storefront systems. Furthermore, the disclosure may extend to devices, systems and methods that would benefit from the disclosure. Those skilled in the art will understand that different combinations and permutations of the components described herein are possible within the spirit and scope of the disclosure, which is defined by the appended Claims, their equivalents, and also Claims presented in related applications in the future and their equivalents.

The disclosure may also involve a number of functions to be performed by a computer processor, such as a microprocessor. The microprocessor may be a specialized or dedicated microprocessor that is configured to perform particular tasks according to the disclosure, by executing machine-readable software code that defines the particular tasks embodied by the disclosure. The microprocessor may also be configured to operate and communicate with other devices such as direct memory access modules, memory storage devices, Internet related hardware, and other devices that relate to the transmission of data in accordance with the disclosure. The software code may be configured using software formats such as Java, C++, XML (Extensible Mark-up Language) and other languages that may be used to define functions that relate to operations of devices required to carry out the functional operations related to the disclosure. The code may be written in different forms and styles, many of which are known to those skilled in the art. Different code formats, code configurations, styles and forms of software programs and other means of configuring code to define the operations of a microprocessor in accordance with the disclosure will not depart from the spirit and scope of the disclosure.

Within the different types of devices, such as laptop or desktop computers, hand held devices with processors or processing logic, and also possibly computer servers or other devices that utilize the disclosure, there exist different types of memory devices for storing and retrieving information while performing functions according to the disclosure. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the disclosure when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the disclosure as described herein enable the physical transformation of these memory devices. Accordingly, the disclosure as described herein is directed to novel and useful systems and methods that, in one or more embodiments, are able to transform the memory device into a different state. The disclosure is not limited to any particular type of memory device, or any commonly used protocol for storing and retrieving information to and from these memory devices, respectively.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure. The machine-readable medium includes any mechanism that provides (i.e., stores and/or transmits) information in a form readable by a machine (e.g., a computer, PDA, cellular telephone, etc.). For example, a machine-readable medium includes memory (such as described above); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

While certain exemplary embodiments have been described and shown in the accompanying drawings, it is to be understood that such embodiments are merely illustrative of and not restrictive on the broad disclosure, and that this disclosure not be limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or Claim refers to "a" or "an" element, that does not mean there is only one of the element. If the specification or Claims refer to "an additional" element, that does not preclude there being more than one of the additional element.

The methods, systems and devices include improved systems and methods for downloading digital content and providing an infrastructure for compensation to authors and other monetization operations. Such systems would greatly benefit from increased convenience for both buyers and sellers. Although this embodiment is described and illustrated in the context of devices, systems and related methods of downloading authored content including music and software applications, the scope of the disclosure extends to other applications where such functions are useful. Furthermore, while the foregoing description has been with reference to particular embodiments of the disclosure, it will be appreciated that these are only illustrative of the disclosure and that changes may be made to those embodiments without departing from the principles of the disclosure, the scope of which is defined by the appended Claims and their equivalents.

What is claimed is:

1. A method for distributing digital content available for purchase and download from a server to a network connected a plurality of computing devices, the method comprising the steps of:
   (a) providing a quantity of digital content items;
   (b) ranking each of the digital content items;
   (c) creating a plurality of pricing tiers for the digital content items;
   (d) designating each of the digital content items to have a sale price within at least one of the plurality of pricing tiers based on the rank of the digital content items;
   (e) electronically making at least a portion of the digital content items available for purchase by transmitting computer executable code over a network that causes the plurality of pricing tiers and the sale price for the content to be displayed on a visual pricing table viewable on at least one user computing device of the plurality of computing devices;
   (f) receiving at least one download request from the at least one user computing device to download at least one digital content item, whereby the at least one of the digital content items is downloaded from the server to the at least one user computing device; and
   (g) adjusting the sale price of at least a portion of the quantity of the digital content items according to the pricing tiers wherein the step of adjusting comprises:
   (h) re-ranking at least a portion of the digital content items; and
   (i) repeating the steps of (e) through (h),
   and wherein when a number of download requests for a digital content item at a top tier of the pricing tiers is more than a predefined amount relative to a next lower tier of the pricing tiers, a higher tier is added automatically to the pricing tiers above the top tier, wherein the higher tier sets a volume limit for the higher tier to be the top tier of the pricing tiers, and wherein the higher tier is visually displayed on the visual pricing table viewable on all of the plurality of computing devices.

2. The method of claim 1, further comprising modifying the sale price according to at least one of a social network buzz of the digital content item and a ranking of the digital content item.

3. The method of claim 1, wherein the step of creating the plurality of pricing tiers further comprises distributing the tiers by percentile based on ranking the digital content items.

4. The method of claim 1, wherein the step of adjusting in (g) further comprises adjusting the sale price of the digital content items according to at least one of the following: a number of downloads; and a percentage of download volume for related content.

5. The method of claim 1, wherein the step of designating in (d) further comprises selecting a content-provider sale price of the digital content item, wherein the content-provider sale price is independent of the plurality of pricing tiers.

6. The method of claim 5, wherein a revenue of a sale of the digital content items is reported for all digital content items except digital content items having content-provider sale prices.

7. The method of claim 1, wherein the step of designating in (d) further comprises receiving an initial price designation from a content owner.

8. The method of claim 1, further comprising modifying a price of at least one of the pricing tiers over a predetermined period of time.

9. The method of claim 8, wherein the step of modifying the pricing tiers further comprises at least one of the following: adding a tier; removing a tier; adjusting a ranking percentile of a tier, adjusting a price in a tier; and splitting a tier.

10. The method of claim 1, wherein the digital content further comprises at least one of: a book; an audiobook; a video; a software program; a music recording; an audio recording; and an electronic game.

11. The method of claim 1, wherein at least one tier of the plurality of tiers has a price of zero dollars.

12. The method of claim 11, wherein the sale price is adjusted from the at least one tier to a second tier, wherein the second tier has a price greater than zero dollars after a period of time.

13. The method of claim 1, wherein the sale price of the digital content item of the step of (g) is adjusted according to a download volume of the digital content item.

14. The method of claim 13, wherein the step of adjusting in (g) is influenced by at least on of: an amount of downloads over a period of time; an amount of downloads of a first digital content item compared to an amount of downloads of a second digital content items; a change in an amount of downloads over a period of time; and a social network buzz.

15. The method of claim 1, wherein at least one of the steps of: ranking in (b), creating in (c); and designating in (d) are controlled by an algorithm executed by a computer.

16. The method of claim 1, wherein a price a first pricing tier is greater than a price of a second pricing tier by a first monetary value and less than a price of a third pricing tier by a second monetary value, wherein the first monetary value is different from the second monetary value.

17. The method of claim 16, wherein the step of re-ranking in (h) further comprises re-ranking according to download volume and time, wherein the sale price is adjusted because the re-ranked content falls into a different tier.

18. The method of claim 1, wherein the step of receiving a download request in (f) comprises receiving a purchase request.

19. A physical computer storage device having stored thereon instructions for distributing digital content available for purchase and download from a server to a network connected computing device, which when executed by a processor, causes the processor to perform the steps of:
providing a quantity of digital content items;
ranking each of the digital content items relative each other;
designating each of the ranked digital content items into at least one of a plurality of pricing tiers based on the rank of the digital content item, respectively;
electronically making at least a portion of the ranked digital content items available for purchase on a network, whereby the plurality of pricing tiers and a sale price of the ranked digital content item is displayed on a visual pricing table viewable on at least one user computing device, wherein the sale price is based on the pricing tier that the digital content item is designated in;
receiving at least one download request from the at least one user computing device to download at least one digital content item, whereby the at least one of the digital content items is downloaded from the server to the at least one user computing device via the network;
adjusting the sale price of at least a portion of the quantity of the digital content items by re-ranking at least a portion of the digital content items; and
designating each of the re-ranked digital content items into at least one of the plurality of pricing tiers,
and wherein when a number of download requests for a digital content item at a top tier of the pricing tiers is more than a predefined amount relative to a next lower tier of the pricing tiers, a higher tier is added automatically to the pricing tiers above the top tier, wherein the higher tier sets a volume limit for the higher tier to be the top tier of the pricing tiers, and wherein the higher tier is visually displayed on the visual pricing table viewable on all of the plurality of computing devices.

20. The physical computer storage device of claim 19, further comprising the step of adjusting the sale price according to at least one of: an amount of downloads of the digital content item over a period of time; an amount of downloads of a first digital content item relative to an amount of downloads of a second digital content item; a change in an amount of downloads of the digital content item over a period of time; and social network buzz.

21. A system for distributing digital content, the system comprising computer executable code modules stored in a memory of a computer wherein the code modules are executed by a processor of the computer which is in communication with the memory, the memory comprising:
(a) a digital content module for receiving and storing digital content items;
(b) a ranking module for ranking the digital content items;
(c) a tier module for creating a plurality of pricing tiers of the digital content items;
(d) a sale price module for designating a sale price for each of the digital content items based on the ranking of the digital content items, wherein the ranked digital content item is designated into one of the plurality of pricing tiers based on the designated sale price;
(e) a publishing module for electronically making the digital content items available for purchase that cause the plurality of pricing tiers and the sale price for the digital content items to be displayed on a visual pricing table viewable on at least on user computing device;
(f) a download module for receiving a download request from the at least one user computing device to download at least one digital content item, whereby the at least one digital content item is downloaded from the server to the at least one user computing device;
(g) a price adjustment module for adjusting the sale price for the digital content item according to the pricing tiers;
(h) a re-ranking module for re-ranking the digital content items; and
(i) a tier modification module for modifying the pricing tiers by at least one of: creating, adding, deleting, and splitting the pricing tiers,
and wherein when a number of download requests for a digital content item at a top tier of the pricing tiers is more than a predefined amount relative to a next lower tier of the pricing tiers, a higher tier is added automatically to the pricing tiers above the top tier, wherein the higher tier sets a volume limit for the higher tier to be the top tier of the pricing tiers, and wherein the higher tier is visually displayed on the visual pricing table viewable on all of the plurality of computing devices.

\* \* \* \* \*